United States Patent
Togawa

(10) Patent No.: US 6,385,639 B1
(45) Date of Patent: May 7, 2002

(54) DEVICE AND METHOD OF CONTROLLING INTERGROUP RESOURCE UTILIZATION

(75) Inventor: Yoshifusa Togawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/029,483

(22) PCT Filed: Jul. 1, 1997

(86) PCT No.: PCT/JP97/02276

§ 371 Date: Feb. 25, 1998

§ 102(e) Date: Feb. 25, 1998

(87) PCT Pub. No.: WO98/00790

PCT Pub. Date: Jan. 8, 1998

(30) Foreign Application Priority Data

Jul. 1, 1996 (JP) .............................. 8-171236

(51) Int. Cl.[7] .............................................. G06F 15/16
(52) U.S. Cl. ...................... 709/200; 709/104; 709/205; 709/226; 709/229; 709/223; 709/224; 707/8; 707/9; 707/10; 707/201
(58) Field of Search ................................ 709/226, 276, 709/200, 828, 229, 224, 223, 102, 104, 103, 105, 205; 707/8, 9, 10, 201

(56) References Cited

U.S. PATENT DOCUMENTS

| | | | | |
|---|---|---|---|---|
| 5,093,912 A | * | 3/1992 | Dong et al. | 709/650 |
| 5,734,909 A | * | 3/1998 | Bennett | 709/726 |
| 5,793,979 A | * | 8/1998 | Lichtman et al. | 709/226 |
| 5,832,511 A | * | 11/1998 | Beck et al. | 707/201 |
| 5,991,793 A | * | 11/1999 | Mukaida et al. | 709/104 |
| 6,047,288 A | * | 4/2000 | Kurosawa et al. | 707/9 |
| 6,088,732 A | * | 7/2000 | Smith et al. | 709/229 |
| 6,101,540 A | * | 8/2000 | Graf | 709/224 |

FOREIGN PATENT DOCUMENTS

| | | |
|---|---|---|
| JP | 5-127969 | 5/1993 |
| JP | 7-306778 | 11/1995 |
| JP | 8-95776 | 4/1996 |

OTHER PUBLICATIONS

U.S. application No. 08/605,638, Togawa et al., filed Feb. 22, 1996.
Hattori et al., "Support for Version Control on Software Development", Information Processing Society of Japan, Research Report, SE 107–8 (vol. 96, No. 6, p. 57–64), Jan. 18, 1996.

* cited by examiner

Primary Examiner—David Wiley
Assistant Examiner—Oanh Duong
(74) Attorney, Agent, or Firm—Staas & Halsey LLP

(57) ABSTRACT

The present invention relates to a resource utilizing and controlling apparatus in a system which groups a plurality of computers interconnected each other, and performs work applied to each group or applied between groups. The resource utilizing and controlling apparatus (10) is formed by: a work procedure preparing unit (1) for preparing work procedures based on an each-group work definition body defining work processes in accordance with a resource used for each group, and an all-group work definition body defining work processes in accordance with use between groups; a resource utilizing and controlling unit (2) for performing control including whether the resource can be utilized or cannot be utilized for each group or between groups, based on the work procedures prepared by the work procedure preparing unit; and a resource managing unit (3) for managing a work situation of the resource for each group or between groups (FIG. 1).

28 Claims, 21 Drawing Sheets

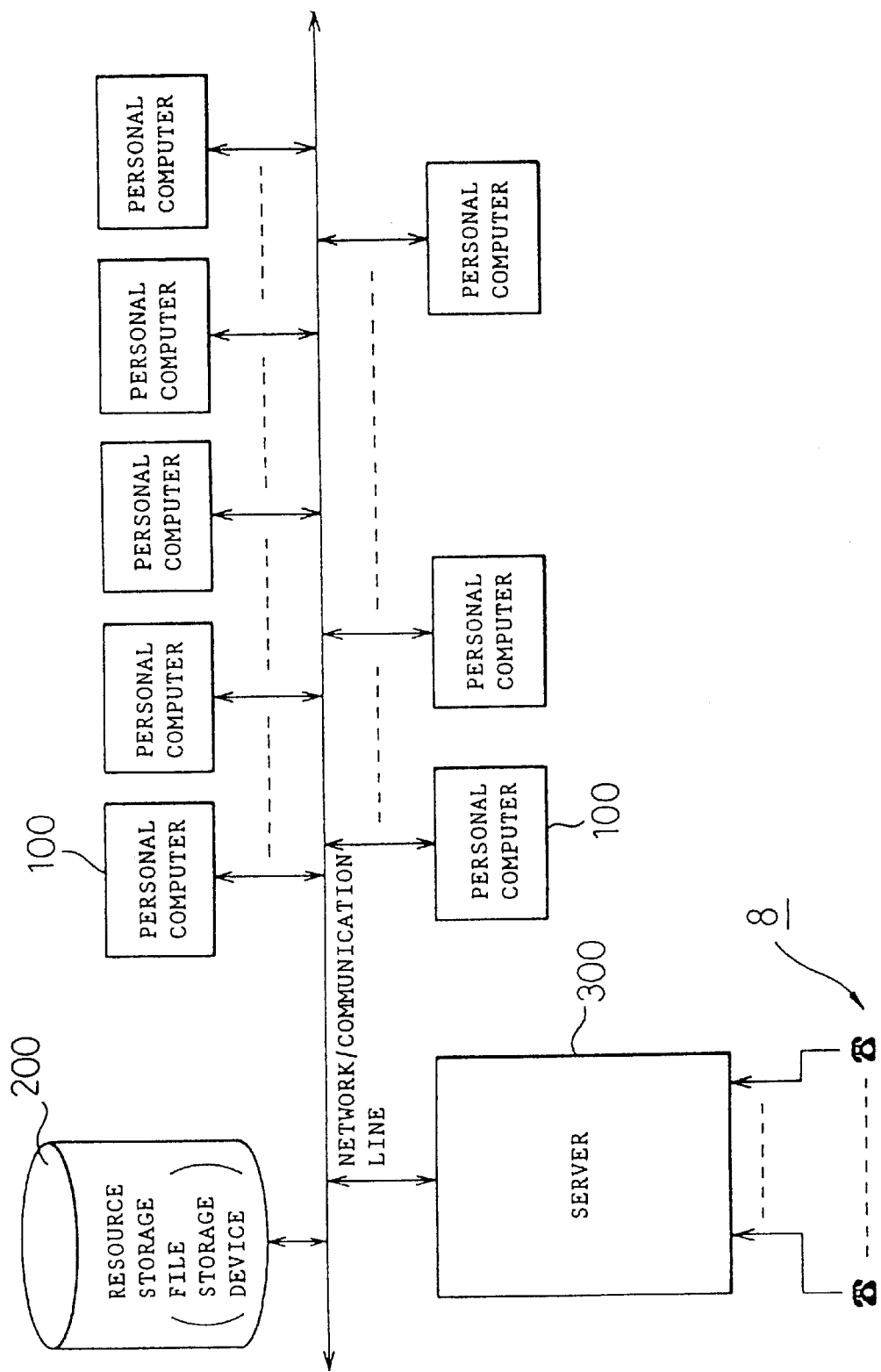

Fig.6

| NAME OF GROUP (NAME OF WORK) | NAME OF WINDOW | NAME OF OBJECT/COMMAND | NAME OF DATA | NAME OF COMMUNICATION | WORK SITUATION | NAME OF NEXT GROUP (NAME OF WORK) | ANOTHER TEMPORARY USER |
|---|---|---|---|---|---|---|---|
| - - - | - - - | - - - | - - - | | - - - | - - - | - - - |
| NAME OF GROUP (NAME OF WORK) | NAME OF WINDOW | NAME OF OBJECT/COMMAND | NAME OF DATA | NAME OF COMMUNICATION | WORK SITUATION | NAME OF NEXT GROUP (NAME OF WORK) | ANOTHER TEMPORARY USER |

Fig.7

| NUMBER OF MAXIMUM REGISTRATION | NUMBER OF REGISTRATION | IDENTIFICATION | NAME OF GROUP (NAME OF WORK) | NAME OF COMMUNICATION | · · · | IDENTIFICATION | NAME OF GROUP (NAME OF WORK) | NAME OF COMMUNICATION |

Fig.8

| NUMBER OF MAXIMUM REGISTRATION | NUMBER OF REGISTRATION | STATE | NAME OF GROUP (NAME OF WORK) | NAME OF COMMUNICATION |

IDENTIFICATION

| STATE | NAME OF GROUP (NAME OF WORK) | NAME OF COMMUNICATION |

IDENTIFICATION

Fig. 9

```
WINDOW INFORMATION
(NAME OF OS, NAME OF CPU, WINDOW ENVIRONMENT
  (SIZE, MENU, ICON, ETC.) ...)
WINDOW STARTING FILE (NAME OF OS, NAME OF CPU)
```

Fig. 10

```
OBJECT AND COMMAND INFORMATION
(NAME OF OS, NAME OF CPU, STARTING FORMAT OF OBJECT, ...)
OBJECT STARTING FILE (NAME OF OS, NAME OF CPU)
```

Fig. 11

```
COMMUNICATION INFORMATION
(LOCATION, DIAL, MESSAGE CODE INFORMATION
 (ABBREVIATED CODE, ETC.), ...)
COMMUNICATION OPERATING FILE (NAME OF MEMBER)
```

Fig.12

DATA ATTRIBUTE INFORMATION
(DATA FORMAT (ATTRIBUTE OF READ ONLY/READ WRITE, ETC.;
   OTHER ATTRIBUTE OF FORMAT, KIND (ANIMATION, SOUND, ETC. ...)

DATA FILE

Fig.13

| NAME OF GROUP (NAME OF WORK) | NUMBER OF MEMBER | NAME OF WORKER |
|---|---|---|
| | | |
| NAME OF GROUP (NAME OF WORK) | NUMBER OF MEMBER | NAME OF WORKER |

Fig.14

| NAME OF PARTICULAR MEMBER | NUMBER OF MEMBER | NAME OF GROUP (NAME OF WORK) | NAME OF WORKER |
|---|---|---|---|
| | | NAME OF GROUP (NAME OF WORK) | NAME OF WORKER |
| NAME OF PARTICULAR MEMBER | NUMBER OF MEMBER | NAME OF GROUP (NAME OF WORK) | NAME OF WORKER |
| | | NAME OF GROUP (NAME OF WORK) | NAME OF WORKER |

Fig.15

| NAME OF GROUP (NAME OF WORK) | NAME OF WORKER | NAME OF PERSONAL COMPUTER | CONNECTION STATE |
|---|---|---|---|
| | | | |
| NAME OF GROUP (NAME OF WORK) | NAME OF WORKER | NAME OF PERSONAL COMPUTER | CONNECTION STATE |

Fig.16

| NAME OF GROUP (NAME OF WORK) | NAME OF WORKER | PERSONAL COMPUTER MANAGING NUMBER OF DESTINATION | NAME OF PERSONAL COMPUTER OF DESTINATION | NUMBER OF TIMES OF COPY | CONTENTS OF COPY | PASS WORD HAVING PERMISSION OF USE |
|---|---|---|---|---|---|---|
| | | | | | | |
| NAME OF GROUP (NAME OF WORK) | NAME OF WORKER | PERSONAL COMPUTER MANAGING NUMBER OF DESTINATION | NAME OF PERSONAL COMPUTER OF DESTINATION | NUMBER OF TIMES OF COPY | CONTENTS OF COPY | PASS WORD HAVING PERMISSION OF USE |

Fig.17

```
ALL WORKS START: START DATE
ALL WORKS COMPLETION SCHEDULE: END DATE
NAME OF GROUP: A

WORK PROCESSES
  NAME OF WORK: DEVELOPMENT A
  WORK COUPLING STATE: ***
  STARTING DATE: START-1
  END DATE: END-1
  NAME OF WORKER: WORKER 1, WORKER 2, WORKER 3, ..., WORKER n
  WORK COMMUNICATION INFORMATION
    WORKER 1: ORDER OF CALLING (MOBILE TELEPHONE (TEL NUMBER), POCKET BELL (CALL NUMBER))
    WORKER 2: NO ORDER OF CALLING (MOBILE TELEPHONE (TEL NUMBER), POCKET BELL (CALL NUMBER))
    ------
    ------
    WORKER n: *****
  WINDOW FOR USE: ***** (UTILIZATION METHOD, PERMISSION METHOD, UTILIZATION TERM)
    ------
    ------
  OBJECT AND COMMAND FOR USE: ***** (UTILIZATION METHOD, PERMISSION METHOD, UTILIZATION TERM)
    ------
    ------
  DATA FOR USE: ***** (UTILIZATION METHOD, PERMISSION METHOD, UTILIZATION TERM)
    ------
    ------
```

```
NAME OF WORK: DEVELOPMENT B
WORK COUPLING STATE: ***
STARTING DATE: START-1
END DATE: END-1
NAME OF WORKER: WORKER 1, WORKER 2, WORKER 3, ..., WORKER n
WORK COMMUNICATION INFORMATION
    WORKER 1: NO ORDER OF CALLING (MOBILE TELEPHONE (TEL NUMBER), POCKET BELL (CALL NUMBER))
    WORKER 2: ORDER OF CALLING (MOBILE TELEPHONE (TEL NUMBER), POCKET BELL (CALL NUMBER))
    ------
    WORKER n: *****
WINDOW FOR USE: ***** (UTILIZATION METHOD, PERMISSION METHOD, PERMISSION METHOD, UTILIZATION TERM)
OBJECT AND COMMAND FOR USE: ***** (UTILIZATION METHOD, PERMISSION METHOD, UTILIZATION TERM)
DATA FOR USE: ***** (UTILIZATION METHOD, PERMISSION METHOD, UTILIZATION TERM)
    ------
NAME OF WORK: DEVELOPMENT K
NAME OF PARTICULAR MEMBER: SEARCH A
    NAME OF WORKER: WORKER 1, WORKER 5, WORKER p, ..., WORKER q
    TERM: 1 TO W
        WINDOW FOR USE: *****
    ------
    ------
```

```
DEVELOPMENT PROCESS START:  [
START:  START OF DATE
END:  END OF DATE
USE:  GROUP.1 (DEVELOPMENT A.1) ....., GROUP.999 (DEVELOPMENT Z.9)
PROJECT MEMBER:  SEARCH A.1, SEARCH A.2, ........SEARCH Z.999
PROCESS 1:
    CREATE GROUP.1 (DEVELOPMENT A.1):
        RESOURCE ([WINDOW 1, ...., WINDOW P],
                  [OBJECT 1, ...., COMMAND 1,
                   ...., COMMAND L],
                  [DATA 1, ...., DATA N])
    CREATE GROUP.2 (DEVELOPMENT B.1):
        ................................
    CREATE SEARCH A:
        RESOURCE ([WINDOWS 1, ...., WINDOWS K],
                  [OBJECT 1, ...., COMMAND 0,
                   ...., COMMAND J],
                  [DATA 1, ...., DATA S])
        ................................
    CREATE GROUP.1 (DEVELOPMENT A.1) . WORKER 9:
        RESOURCE ([WINDOWS 4],
                  [OBJECT 6, COMMAND 0],
                  [DATA 5]
        ....................
................................................
```

```
PROCESS 1A:
    FOR (TIME N WEEK)
        IF (STATUS:  GROUP.1 (DEVELOPMENT A.1) = END)
        THEN EXIT:  PROCESS 1A
        IF (STATUS:  GROUP.2 (DEVELOPMENT B.1) = END)
        THEN EXIT:  PROCESS 1A
        ........................
    END FOR PROCESS 1A
    WAIT ((GROUP 1 (DEVELOPMENT A.1) AND GROUP.2
          (DEVELOPMENT B.1)) STATUS = END)
    DELETE GROUP.1 (DEVELOPMENT A.1):
        RESOURCE ([WINDOW, ...., WINDOW P],
                  [OBJECT 1, ...., COMMAND 1,
                   ...., COMMAND L],
                  [DATA 1, ...., DATA N])
    DELETE GROUP.2 (DEVELOPMENT B.1):
        .......................................
    WAIT (SEARCH A.1 STATUS = END)
    DELETE SEARCH A:
        RESOURCE ([WINDOWS 1, ...., WINDOWS K],
                  [OBJECT 1, ...., COMMAND 0,
                   ...., COMMAND J],
                  [DATA 1, ...., DATA S])
    DELETE GROUP.1 (DEVELOPMENT A.1) . WORKER 9:
        RESOURCE ([WINDOWS 4],
                  [OBJECT 6, COMMAND 0],
                  [DATA 5])
        ................................................
PROCESS 2:
    CREATE ..................
........................................
PROCESS 2A:
    FOR (TIME S WEEK)
        ........................
    END FOR PROCESS 2A
    ........................
]
```

*2

DEVICE AND METHOD OF CONTROLLING INTERGROUP RESOURCE UTILIZATION

TECHNICAL FIELD

The present invention relates to a resource utilizing and controlling apparatus, and a control method for the same, used in groupware.

BACKGROUND ART

In accordance with recent requirements for high performance and high speed of computer systems, it is important to develop an environment, formed of a network, which a plurality of computers are connected to one another in order to achieve the above requirements. On the other hand, in accordance with the recent development of groupware, an environment is required that can use groupware for each group unit, such as a project team for development, without recognition of the network environment.

In the above circumstances, for example, when a plurality of groups are simultaneously provided on one network or when the plurality of groups utilize a certain resource, for example, an object (program), data, window, command, etc., it is important to ensure security of the resource in order to protect the contents from an unauthorized use of the resource. Accordingly, a system for managing the resource has been proposed in order to ensure the security of the resource.

On the other hand, when the resource is used in each group unit, the resource is utilized in common only within that group and it is possible to provide a window for each group unit. As a result, although the security of the resource can be ensured for each group unit, it is impossible to access that resource from another group, and therefore, there is a problem from the viewpoint of an effective utilization of the resource.

However, when the resource is shared by a plurality of groups, the resource belonging to another group can be easily utilized by each group. However, in this case, there is a problem in that it is difficult to ensure the security of the resource. Further, for example, when there is a resource having the same name as a resource contained in another group, the management of the resource in each group unit sometimes becomes difficult so that there is a danger that the resource belonging to one group is destroyed in error by another group. As mentioned above, security is required when a plurality of groups utilize a resource in common, and improvement in the management of the resource is also required.

As mentioned above, groupware has recently developed as a system which processes work in each group unit. In a conventional groupware, there are two kinds of groupware, i.e., one is groupware dealing with independent work for each group unit, and the other is groupware dealing with common work through the network. In these types, with an increase in the work to be processed in each group unit, it is required to ensure security and to improve the work efficiency of the groupware.

That is, in the conventional art, it was impossible to process work by mutually utilizing a resource, such as an object, etc. which was prepared in each group unit, among a plurality groups. However, in order to resolve this problem, for example, one worker who belongs to a plurality of groups with overlap can access the resource contained in another group, and he receives or transfers the resource from or to another group so that it is possible to realize mutual use of the resource.

In the above case, however, when the security of the resource between groups is defined very severely, it is impossible to hold the resource in common among a plurality of groups so that there is a problem in which the work efficiency falls. Conventionally, in order to resolve this problem of a drop in work efficiency, there is a method for temporarily releasing the restriction on the use of the resource which is required at the time when the group configuration is changed or when a worker moves to another group. However, it is apparent that this method also results in poor management of the resource. Accordingly, in order to resolve this problem, it is required to reduce the changes in the group configuration or movement of workers to other groups as much as possible. In this case, however, there is a problem in which the worker may be bound to one group and the work may be restricted to only a fixed group unit.

As mentioned above, when the efficiency of the work and common use of the resource are preferentially considered, there are various problems which make it difficult to ensure the security of the resource. In this case, since an adjustment, taking a balance between the efficiency of the work and common use of the resource, is dependent on the work of the worker or the manager, there is a problem in which it is very troublesome to perform an adjustment of the work.

Accordingly, in order to improve the efficiency of the work performed in the group, it is desired to deal with flexibly the management of the resource, the movement of the workers, and the change of the group configuration, for each group unit, and to automatically receive and transfer the work between groups in accordance with procedures and situations. From this viewpoint, it is required that each group maintains independent management of the resource, and receives and transfers the resource in accordance with procedures for each group unit by handing over the resource, such as window corresponding to the work, from the current group to another group, to be used.

The present invention aims to ensure security of the resource and to improve efficiency in the group work in a network environment or in an environment which does not recognize the network, when the work is performed by using groupware in each group unit.

That is, the present invention aims to dynamically provide the resource, for example, window, object (program), command, data, etc., and the right to use each work process in each group unit, based on a work definition body which defines the contents and procedures of the work for each group unit. Further, the present invention aims to ensure security of the resource and to perform the following processes.

1) When it is necessary to utilize the resource, for example, window, etc., which is held by another group, permission to use is obtained from another group, and the work is performed using that window.
2) The data and work procedures are delivered from one group to another group, the processes for the work are requested from one group by another group so that one group receives the result of processes.
3) When predetermined works are completed and, as a result, a development project is completed, a movement of work members and a change of the project group are performed in order to start next project. As a result, the resources which are held by each group are changed and rearranged.
4) After completion of above work, the original resource, for example, window, object (program), command, data, etc., which could not be used due to movement of the worker and rearrangement of the work, is copied in each group and all resources are cleared (or erased).

5) If the new work is started, the resources are replaced in an environment of another group of destination which the new work was started.

6) If the worker who moved to anther group, has a right to use the resource in a previous group and loses the right to use as a result of movement and rearrangement, it is possible for the worker to continuously utilize the previous resource.

7) The environment of the window is replaced.

The present invention aims to realize high work efficiency by using groupware based on the above processes.

DISCLOSURE OF THE INVENTION

According to one aspect of the present invention, in a resource utilizing and controlling apparatus in a system which groups a plurality of mutually connected computers and performs work applied to each group or applied between groups, characterized in that the apparatus includes a work procedure preparing means for preparing work procedures, based on an each-group work definition body defining work processes based on resources used for each group unit, and an all-group work definition body defining work processes based on resources used between groups; a resource utilizing and controlling means between groups for controlling "usable" or "unusable" resources for each group unit or between groups; and a resource managing means for managing situation of works for each group or between groups.

According to another aspect of the present invention, in a resource utilizing and controlling method in a system which groups a plurality of mutually connected computers and performs work applied to each group or applied between groups, characterized in that the method includes a step for preparing an each-group work definition body defining work processes based on resources used for each group unit, and an all-group work definition body defining work processes based on resources used between groups; a step for preparing work procedures based on the each-group work definition body and the all-group work definition body; a step for controlling "usable" or "unusable" resource for each group or between groups; and a step for managing situation of works for each group or between groups.

According to still another aspect of the present invention, the invention includes a storage medium readable by a computer and storing a program able to perform the following steps; i.e., a step for preparing an each-group work definition body defining work processes based on resources used for each group unit, and an all-group work definition body defining work processes based on resources used between groups; a step for preparing work procedures based on the each-group work definition body and the all-group work definition body; a step for controlling "usable" or "unusable" resource for each group or between groups; and a step for managing situation of works for each group or between groups, to the computer used for a system which groups a plurality of mutually connected computers and performs work applied to each group or applied between groups.

BRIEF EXPLANATION OF DRAWINGS

FIG. 5 shows a system structural view applying the present invention, and forms a resource utilizing and controlling apparatus between groups based on a server and a resource storage according to the present invention.

FIG. 6 shows a detailed explanatory view of a resource managing table.

FIG. 7 shows a detailed explanatory view of "a name of next group (a name of work)" in the resource managing table.

FIG. 8 shows a detailed explanatory view of "another temporary user" in the resource managing table, FIG. 9 shows a detailed explanatory view of a window storage.

FIG. 10 shows a detailed explanatory view of a program and command storage.

FIG. 11 shows a detailed explanatory view of a communicating information storage used for a mobile telephone in an absence of a destination.

FIG. 12 shows a detailed explanatory view of a data storage.

FIG. 13 shows a detailed explanatory view of a work member table within a group managing table.

FIG. 14 shows a detailed explanatory view of a particular member table within a group managing table.

FIG. 15 shows a detailed explanatory view of a connection managing table.

FIG. 16 shows a detailed explanatory view of a copy managing table.

FIGS. 17 and 18 show detailed explanatory views of an each-group work definition body.

FIGS. 19 and 20 show detailed explanatory views of an all-group work definition body.

A BEST MODE FOR CARRYING OUT THE INVENTION

Figure 1:
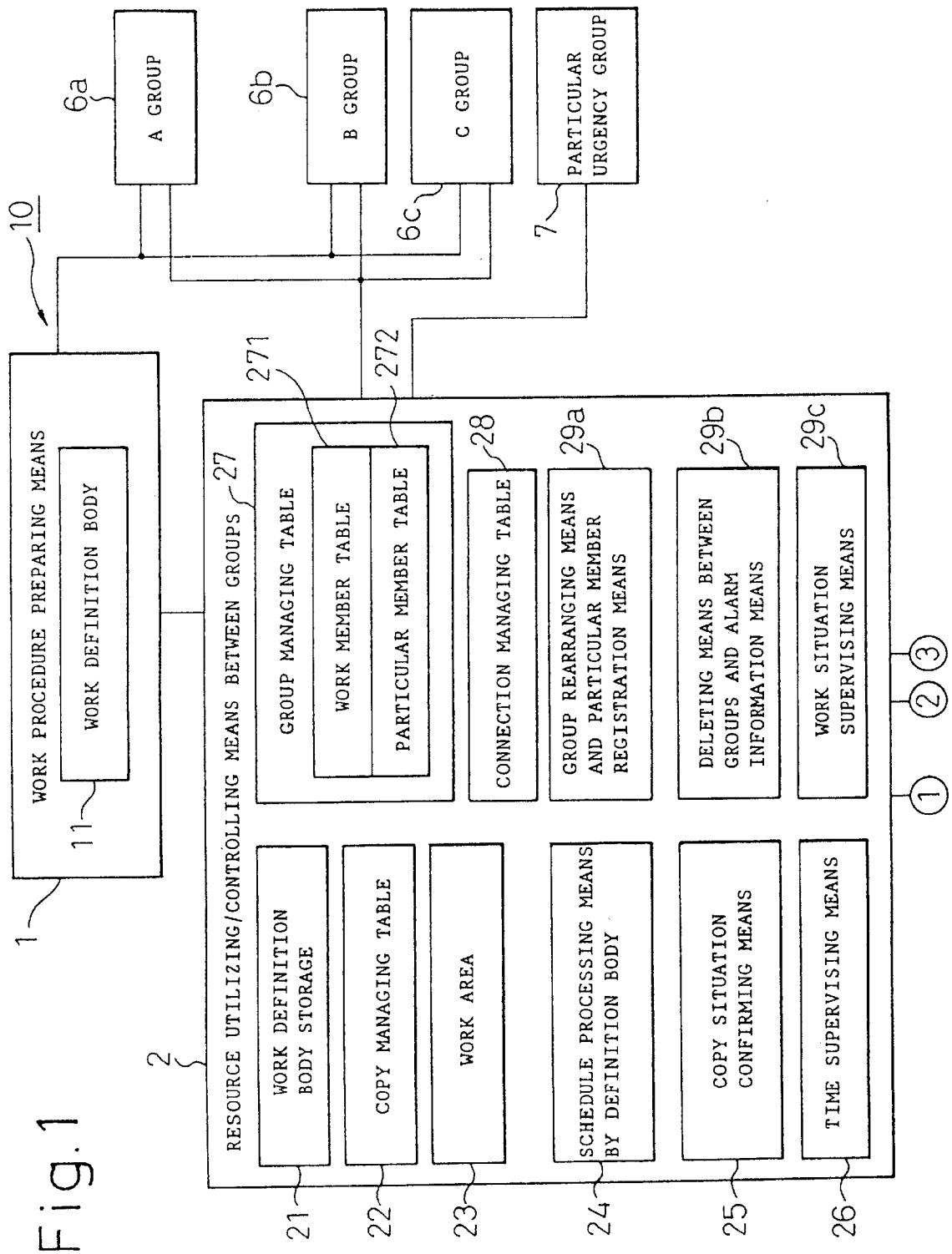
FIGS. 1 and 2 show basic structural views according to the present invention.
Figure 2:
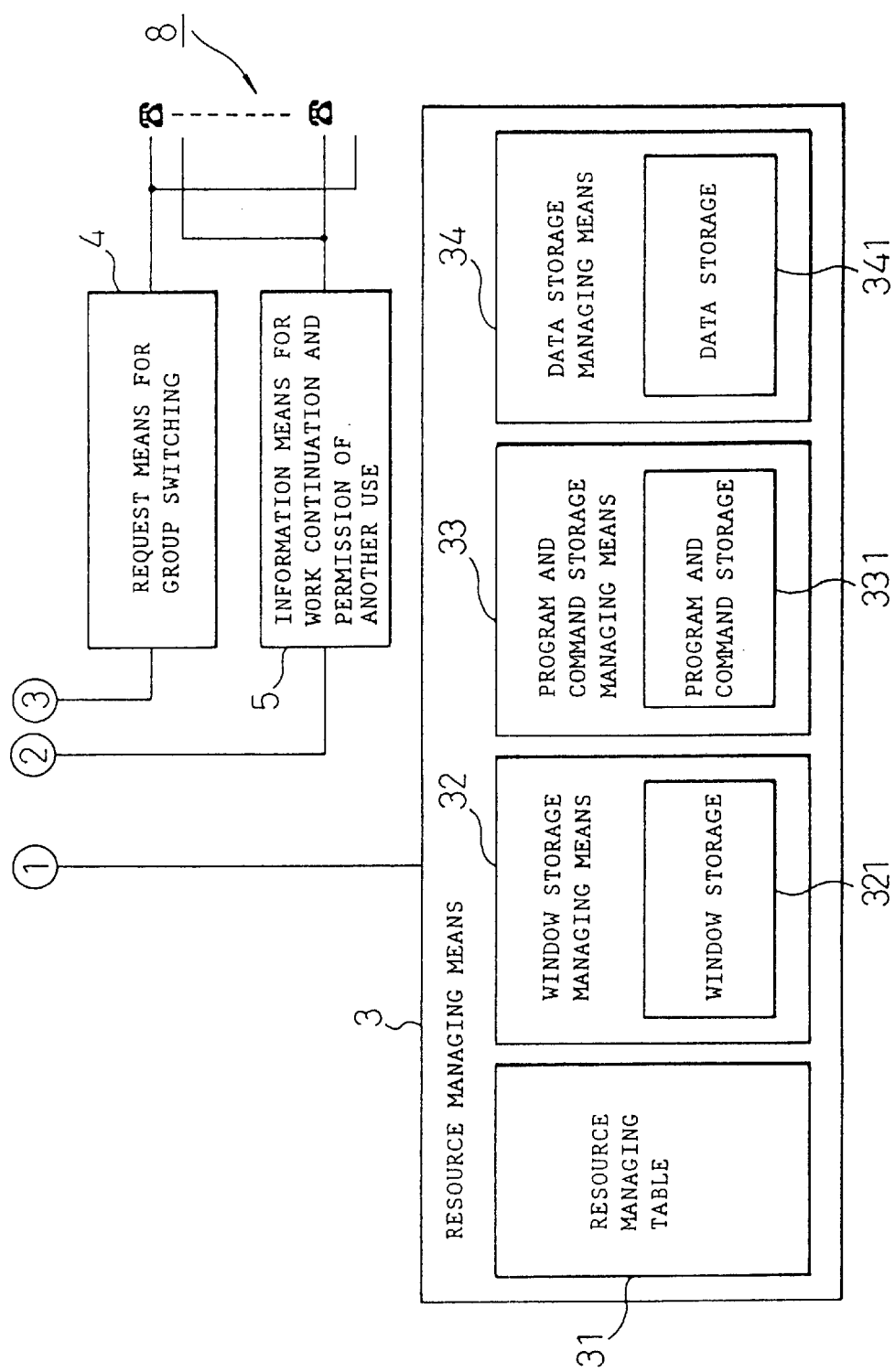

FIGS. 1 and 2 show basic structural views according to the present invention. In the drawings, reference number 1 denotes a work procedure preparing means, reference number 2 denotes a resource utilizing and controlling means between groups, and reference number 3 denotes a resource managing means. Reference number 4 denotes a request means for requesting group switching, and reference number 5 denotes an information means for informing work continuation and utilization permission by another user. Further, reference numbers 6a to 6c denote groups each formed by, for example, a personal computer. Reference number 7 denotes a particular urgency group, and reference number 8 denotes telephone groups.

The work procedure preparing means 1 includes a work definition body 11, and the information for switching the right to use between groups, for example, windows, etc., are defined in the work definition body 11. Further, an each-group work definition body (see FIGS. 17 and 18 ) used by each group, and an all-group work definition body (see FIGS. 19 and 20 ) used by all groups are provided in the work definition body.

The resource utilizing and controlling means between groups is formed by a work definition body storage 21 for storing the work definition body 11, a copy managing table 22, a work area 23 as a memory area for the work, a schedule processing means 24 by the definition body, a confirmation means 25 of a copy situation to each group, a time supervising means 26 for supervising process time, a group managing table 27 including a work member table 271 and a particular member table 272, a connection managing table 28 for managing connection between groups, a group rearrangement and particular member registration means 29a, an erasing means between groups at loss of the right and alarm information means 29b, and a work situation supervising means 29c.

The resource managing means 3 includes a resource managing table 31, a window storage managing means 32 including window storage 321, a program and command storage managing means 33 including program and command storage 331, and a data storage managing means 24 including data storage 341.

Figure 3:
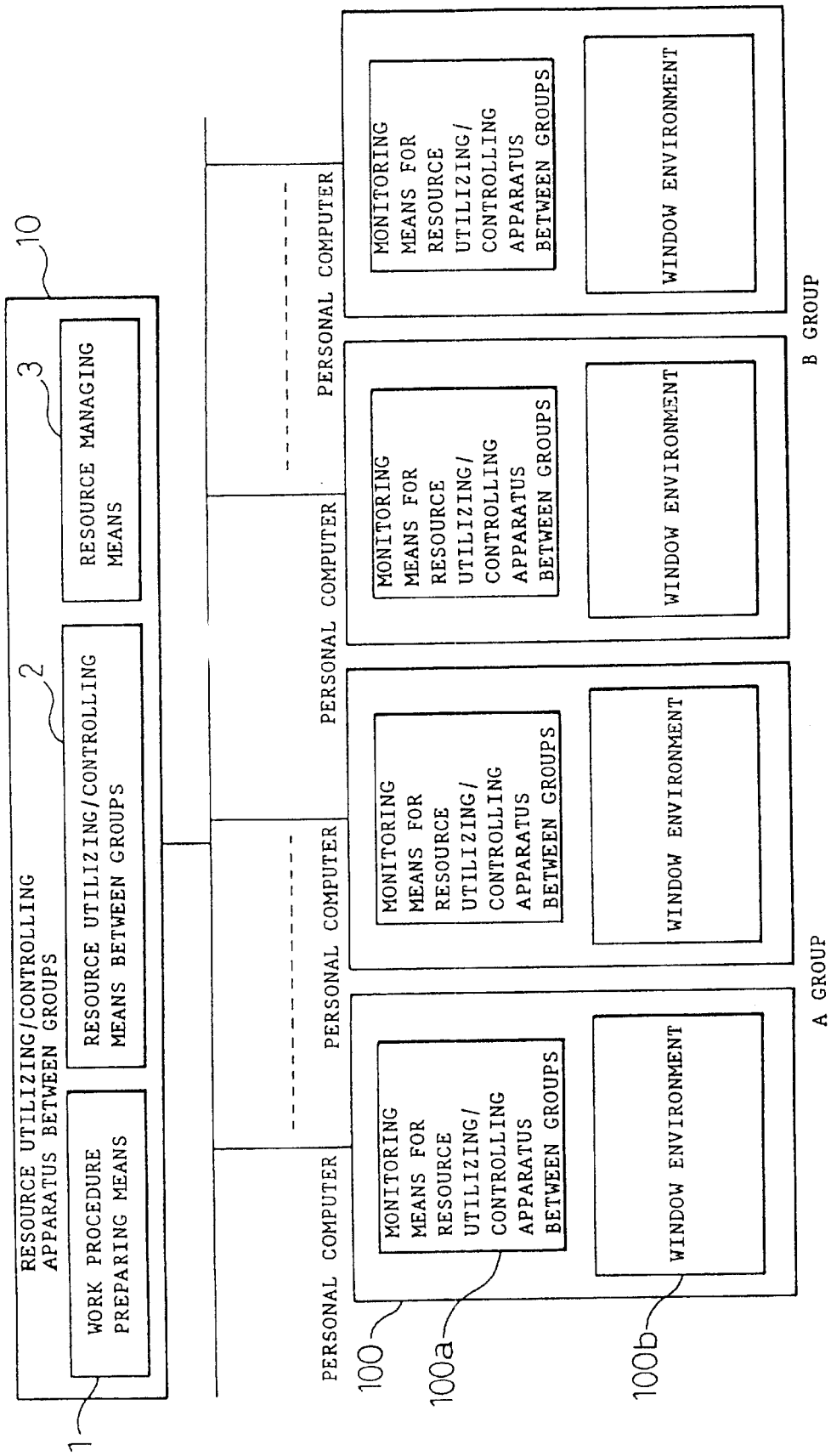
FIG. 3 shows a connection structural view between a resource utilizing and controlling apparatus and each group.

FIG. 3 shows a connection structural view between a resource utilizing and controlling apparatus and each group. The resource utilizing and controlling apparatus between groups 10 includes the work procedures preparing means 1, the resource utilizing and controlling means between groups 2, and the resource managing means 3. On the other hand, a personal computer, a work station and the like (below, a personal computer) 100 includes a monitoring means 100a for the resource utilizing and controlling apparatus between groups, and a window environment 100b. A plurality of personal computers 100 is divided into, for example, an A-group formed by a software development team and a B-group formed by a hardware design team. The window environment of each group can be exclusively used as the resource within the group.

Figure 4:
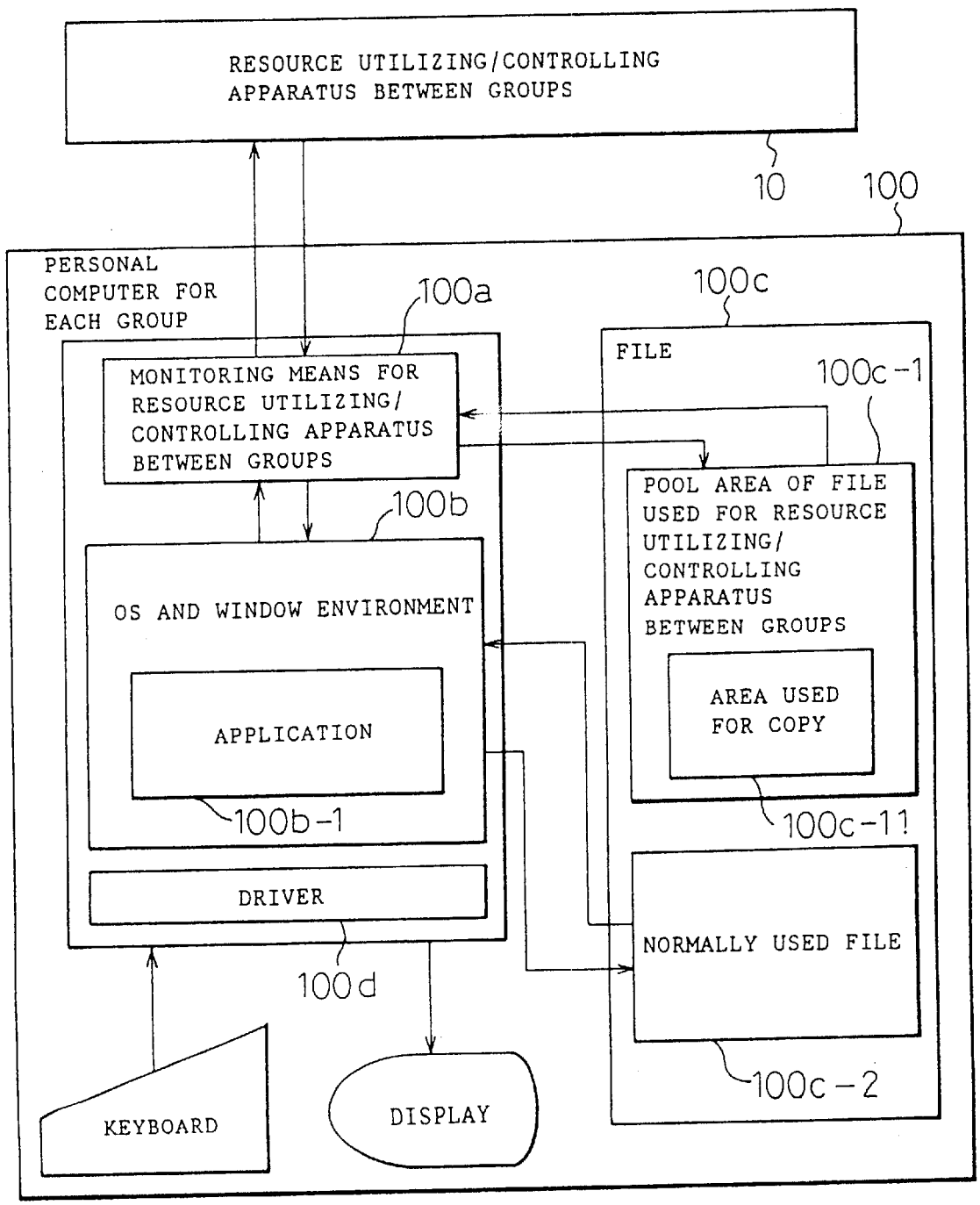
FIG. 4 shows a detailed structural view of each personal computer forming a group.

FIG. 4 shows a detailed structural view of each personal computer forming a group. The supervising of the resource and communication are performed between the monitoring means 100a and a file-pool area 100c-1. An application 100b-1 is included in an operation system (OS) and window environment 100b. Further, the file 100c includes a pool area (particular file area) 100c-1 of the file used in the resource utilizing and controlling apparatus between groups and a file 100c-2 which is usually used. Further, the pool area 100c-1 of the file includes a copy area 100c-11 used by coping the data program, etc., in which the permission for use is provided by the resource utilizing and controlling apparatus between groups.

FIG. 5 shows a system structural view applying the present invention. The resource utilizing and controlling apparatus between groups according to the present invention is formed by a server 300 and a resource storage 200. A plurality of personal computers, the resource storage 200, and the server 300 are interconnected through a network such as LAN or a communication line. For example, a plurality of mobile telephones 8 are connected to the server 100. A plurality of personal computers 100, as shown in FIG. 3, are divided into some groups, such as, A-group, B-group, etc., in accordance with its purpose.

In the above mentioned structure, in the present invention, as shown in FIG. 4, there is the particular file area 100c-1 which cannot easily deliver the resource, which is used in the resource utilizing and controlling apparatus 10, to an external stage. Further, there is the monitoring means 100a for supervising between the resource utilizing and controlling apparatus 10 and the particular file 100c-1, and the access therebetween is performed only through the monitoring means 100a. As a result, the present invention can ensure the security of the resource in the resource utilizing and controlling apparatus 10 and the security of copy of the software to each group, and can easily deal with the resource if it is copied to each personal computer.

As shown in FIG. 1, the situation of the personal computer which uses the copy is controlled in such a way that the copy situation confirming means 25 checks the connection management table 28 storing connection information using the copy situation confirming means 25 and the work situation supervising means 29c of each group.

At that time, the copy situation confirming means 25 has a password for permission to use in order to confirm the copy operation so that the security of the resource is strengthened according to a double security system based on an approval of use of the resource, and it is possible to prevent easy copy and an improper use of copy.

Further, in the personal computer in each group, it is impossible to check the contents in the area of the information sent from the resource utilizing and controlling means between groups, when either there is no monitoring means or there is no connection between the monitoring means and the resource utilizing and controlling apparatus. Further, in order to insure the information, the resources, such as object, etc., copied to the personal computer, are encrypted and compressed. For example, when the communication line is accidentally disconnected on the way, the monitoring means performs connection of the line. If recovery of the connection of the line is impossible, the monitoring means clears (or erases) all information copied.

The work situation supervising means 29c informs disconnection of the line, and, at that time, sets the disconnection of the line into the connection management table 28. Further, the work situation supervising means 29c informs disconnection of the line to the copy situation confirming means in each group. After above communication, the copy situation confirming means 25 in each group performs a logging operation of copy situation, and sets the count to a null state "NULL". When the line is connected, the monitoring means in the personal computer in each group confirms whether the copy area is cleared, and sets the count to zero when the copy area is cleared. When the count is set to the null state, the monitoring means informs the null state to another member in the same group in order to request "clear". In this case, as a name of personal computer, it may be possible to use a registration number when connecting it to the line, without the use of a name of an equipment.

Further, the work situation supervising means 29c communicates with the monitoring means 100a of the personal computer in each group, and performs communication regarding connection state and right acquisition.

The time supervising means 26 informs the time to the schedule processing means 24 which is processed by the definition body (i.e., each-group work definition body and all-group work definition body), when the time has elapsed in accordance with the time allocated by the work definition body.

The schedule processing means 24 by the definition body sends prolongation of the work by referring the definition body to the work situation supervising means 29c when the definition body is received.

The work situation supervising means 29c receives the information of prolongation after reception of the notice, sends the information to each group and confirms the prolongation of the work. The corresponding group transfers the revision of the work schedule to the schedule processing means 24 and revises the definition body.

Further, the work situation supervising means 29c refers the connection managing table 28 when receiving confirmation request of the right to use from each group, and requests an urgent information to the resource managing means 3 when confirming that the destination to be confirmed is not connected. The resource managing means 3 sends this information to the resource utilizing and controlling means 2. After this communication, the resource managing means 3 sends the information to the request means 4 for switching the group, and receives the permission for the right to use. The resource managing means 3 receives the permission for the right to use from the request means 4, and receives the information. Further, the resource managing means 3 writes the permission for the right to use into the resource managing means 3. The resource managing means 3 sends completion of writing to the resource utilizing and controlling means 2. Further, the resource utilizing and controlling means 2 communicates with the A-group 6a (see FIG. 1). When the resource managing means 3 does not receive the permission for the right to use, the resource managing means 3 informs this matter to the groups which transferred the request, and not the resource managing means 3. In this case, the definition body is formed so as to operate (perform the work) by utilizing both the work definition body of the each-group and all-group work definition body.

The operations of the present invention will be explained in detail hereinafter.

According to the present invention, for example, when there are a plurality of groups on the network, the work of each group is independently performed. Each group is managed in such a way that the group can access the window (i.e., window environment) within its own group, but it cannot access the window which belongs to another group. As a result, each group can perform independently for each group unit without any influence from external environment.

Further, when opening in error another window which belongs to another group, it is possible to automatically prevent destruction of data caused by erroneous operation since another window cannot be opened if the permission to use is not given from another window. Further, it is possible to prevent erroneous destruction of data since it is possible to use the window by setting a limitation conditions of use. Similarly, it is possible to prevent destruction of the program and command, and it is possible to prevent destruction of common data.

For example, when a certain group requests the access to the window of another group, another group sends a notice of use to the work situation supervising means 29c. As mentioned above, it is performed by communicating with the monitoring means of each group and a part having the same function as the monitoring means.

The work situation supervising means 29c requests the change of the resource having the right of utilization in accordance with the work contents of the work definition body and the work procedures which are previously defined 30 that the window can temporarily access only the permitted window within windows in another group. As a result, it is possible to realize high work efficiency.

Further, when the current work is completed or changed to other work, and the new work is started in the group, since the windows are automatically changed based on the new contents of the work by using the work situation supervising means 29c, the work member of each group follows its own work so that it is possible to follow all work in the group.

Further, regarding prolongation of use of the resource, the resource utilizing and controlling apparatus between groups, the monitoring means and the function corresponding to the monitoring means in each group are used. In the process of confirming prolongation of use or temporary use of the resource by another group, means for considering a loss of the right at the group, in which temporary use of the resource is permitted, and for communicating prolongation of the time due to a timing of use, is provided so that it is possible to easily perform prolongation of use of the resource. As a result, it is possible to smoothly perform the work.

Further, after communication, if the member having the right becomes different between groups, the group which sets the right of temporary use can use the group without change of the environment by obtaining permission for prolongation of use. Further, when the right belongs to its own group, it is possible to use the group by prolongation of use of the resource so that it is possible to perform the work in advance.

Further, in the urgent case, a group 7 is provided for use of particular urgency (see FIG. 1) in order to access the resources of all groups, such as window, object, command, data, etc. When an urgent work or urgent matter occurs, or when the correctness of the work defined in the work procedures cannot be confirmed, it is possible to take a countermeasure by using the group 7 used for particular urgency.

In the above explanations, although the window is mainly explained as a representative resource, the same explanations are given to other resources, such as program (object), data, command, etc. Further, it is possible to reduce an overhead of communication lines by using the copy of the resource. Further, the change of the window can be automatically performed. Accordingly, the personal computer in each group includes the monitoring means 100a for communicating with the resource utilizing and controlling means 2 between groups so that it is possible to automatically change the window in accordance with the schedule of the definition body. Further, in the copy operation, the use of the copy is informed to the window when changing the window, and the check is performed by using an approved password. When the approval is obtained, the copy is performed to an area which can be used at monitoring through the monitoring means 100a and the copy operation can be performed from the window.

The embodiments according to the present invention will be explained with reference to drawings below.

FIG. 6 shows a detailed explanatory view of a resource managing table. As shown in FIG. 6, a resource managing table is formed in a name of a group, a name of a window, a name of an object/command, a name of data, a name of connection, a work situation, a name of next group (a name of work), and a name of an other temporary user.

The situation of the work (i.e., situation of use of the window, the object or the command) is expressed by the following numerals.

000: unused:

0YX: exclusively used;

X=2: used by all members in the group in the present work;

X=3: used by all particular members in the present work;

X=4: used by a person in the present work;
Y=0: don't permit temporary use of another resource;
Y=1: used by all members in the group in which temporary use of another resource is permitted;
  used by all particular members in which temporary use of another resource is permitted; and
  used by a person in which temporary use of another resource is permitted
1YX: commonly used;
X=1: commonly used in the current work;
X=2: commonly used by all members in designated group in the current work;
X=3: commonly used by all designated members in the current work;
Y=0: don't permit temporary use of another resource which is not commonly used;
Y=1: used by all members in which temporary use of another resource, which is not commonly used, is permitted in the group;
  used by all particular members in which temporary use of another, which is not commonly used, is permitted in the group;
  used by a person in which temporary use of another window, which is not commonly used, is permitted;

FIG. 7 shows a detailed explanatory view of "a name of next group (a name of a work)" in the resource managing table. As shown in the drawing, the name of next group (a name of a work) is formed by the following contents.

the number of maximum registration represents the maximum number in which a reservation table of the group/particular member/person having the right of use in order can take (in this case, identification, a name of group (a name of a work), and a name of communication are counted as "one set");

the registration number represents which is stored in the reservation table of the group/particular member/person having the right to use in order;

identification:
  00=a name of group (a name of a work)
  01=a name of particular member
  10=a name of individual a name of group (a name of a work) represents a name of group (a name of a work), a name of particular member, and a name of individual (the form of the name of group is the same as the group name of the resource managing table);

a name of communication is the same as the name of communication of the resource managing table.

FIG. 8 shows a detailed explanatory view of "another temporary user" in the resource managing table in the resource managing table of FIG. 6. The "another temporary user" of FIG. 6 is formed by the following contents.

the number of maximum registrations represents the maximum number in which the reservation table of the group/particular member/person having the right for temporary use of the resource can take (in this case, situation, identification, a name of group (a name of a work), and a name of communication are counted as "one set");

the registration number represents the number which is stored in the reservation table of the group/particular member/person having the right for temporary use of the resource (in this case, situation, identification, a name of group (a name of a work), and a name of communication are counted as "one set").

situation: 0, this represents validity only during the term in which the group/particular member/person have the right;

1, this represents that the time is extended until the group/particular member/person having another temporary use of the resource obtain the right to use the resource and until the work is completed;

2, this represents that the prolongation of the time is permitted until the group/particular member/person having another temporary use obtain the right to use the resource and until the work is completed;

3, this represents that, when the persons having the right to use the resource at the present time are overlapped for the work having the permission to use by only the group/particular member/person having another temporary use, the use of any persons having the right to use can be permitted after change of the group.

identification:
  00, a name of group (a name of a work)
  01, a name of particular member
  10, a name of individual a name of group (a name of a work) represents a name of group (a name of a work), a name of particular member, and a name of individual (the form of the name of group is the same group name as a group name of the resource managing table);

a name of communication is the same name as a name of communication of the resource managing table FIG. 9 shows a detailed explanatory view of a window storage shown in FIG. 6. The window storage is formed by the information of window (a name of OS, a name of CPU, and window environment (size, menu, icon, etc.) and a window starting file (a name of OS, a name of CPU). Where, the OS represents an operating system, and the CPU represents a central processing unit.

FIG. 10 shows a detailed explanatory view of a program/command storage shown in FIG. 2. The program/command storage 331 is formed by the information of the object and command (a name of OS, a name of CPU, a form of start of the object) and an object starting file (a name of OS and a name of CPU).

The name of the OS in FIGS. 9 and 10 can include the name of the window, the name of version, etc.

FIG. 11 shows a detailed explanatory view of a communicating information storage used for a mobile telephone in the absence of a destination. The communicating information storage is formed by communicating information (location, dial, message code, etc.) and a communicating operation file (a name of member).

FIG. 12 shows a detailed explanatory view of a data storage. The data storage is formed by a data attribute information (data format (read only/read write, for example, format, kinds (animation, sound, etc.), and attribute) and data file.

FIGS. 13 and 14 show detailed explanatory views of the group managing table. In this case, FIG. 13 shows a work member table, and FIG. 14 shows a particular member table. In FIG. 13, the work member table is formed by a name of group (a name of a work), the number of member, a name of worker, etc. The number of members denotes the number of workers, and a name of a worker denotes an individual name of worker. In FIG. 14, the particular member table is formed by a name of particular member, the number of member, a name of group (a name of a work), a name of worker, etc. The name of particular member corresponds to the name which is used in the resource managing table. The name of particular member is attached separately from the name of group since the particular member is extended over the group. The number of member counts a name of group and a name of worker as one set, and represents the registration number of a member contained in the particular member. The name of worker represents a name of individual which performs the work.

FIG. 15 shows a detailed explanatory view of a connection managing table. The connection managing table is formed by a name of group (a name of a work), a name of a worker, a name of personal computer, connecting state, etc. The name of group (a name of a work) represents the name of group to which the group belongs, and does not represents the particular member and individual. The name of worker represents the name of a worker who utilizes the group. The name of personal computer represents the name of a personal computer connected to the resource utilizing and controlling means between groups. The connecting state is represented by, 00=unused, 01=used, and 10=failure of line.

FIG. 16 shows a detailed explanatory view of a copy managing table. The copy managing table is formed by a name of group (a name of a work), a name of worker, a personal computer managing number to be used, a name of personal computer to be used, the times of copy, the contents of copy, a password for permission of use, etc.

FIGS. 17 and 18 show detailed explanatory views of an each-group work definition body, and FIGS. 19 and 20 show detailed explanatory views of an all-group work definition body. These work definition bodies are provided in the work procedure preparing means 1 shown in FIG. 1. As mentioned above, the work procedure preparing means 1 provides the work procedures based on these work definition bodies which define the work processes and work procedures for each group or all groups. The right to use the resource is dynamically attached based on these work definition bodies.

Figure 21:
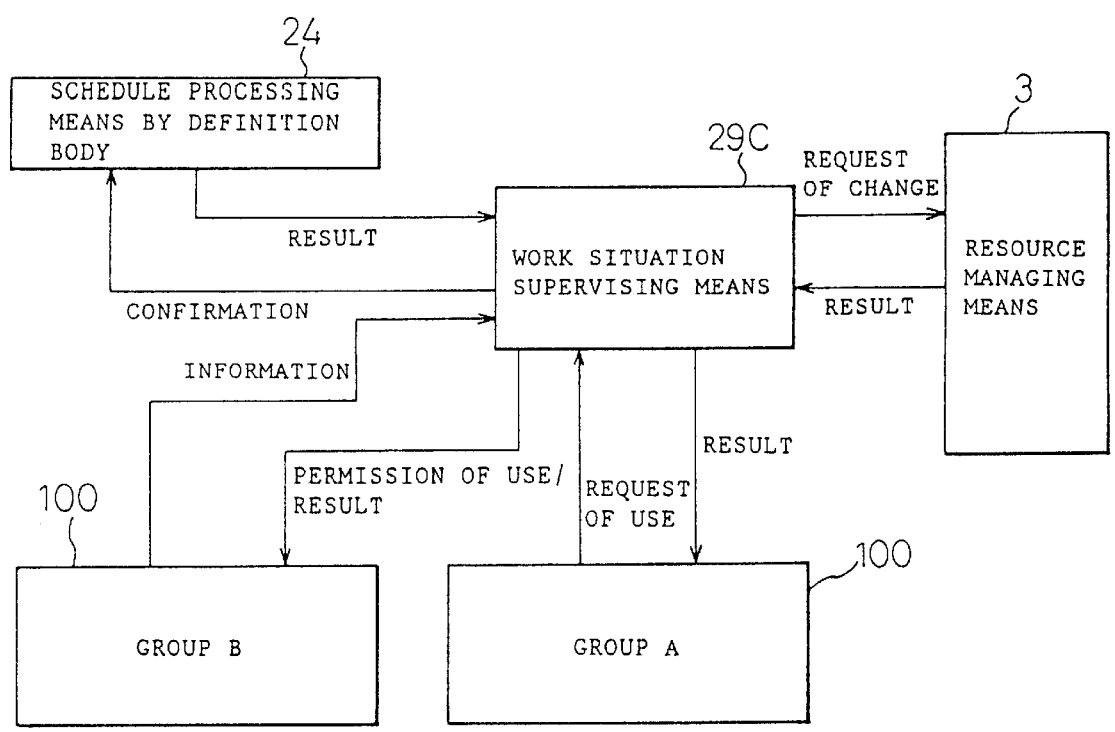
FIG. 21 shows an explanatory view for explaining a confirmation process of a request of a right to use between the resource utilizing and controlling apparatus and the group.

FIG. 21 shows an explanatory view for explaining a confirmation process of a request of a right to use between the resource utilizing and controlling apparatus and the group. In FIG. 21, the schedule processing means 24 sends a result of process to the work situation supervising means 29c, and the work situation supervising means 29c returns the confirmation to the schedule processing means 24.

Further, the work situation supervising means 29c sends the request of change to the resource managing means 3, and the resource managing means 3 returns the result of the change to the work situation supervising means 29c. Further, the group A sends a request of use to the work situation supervising means 29c, and the work situation supervising means 29c returns the result of the request to the group A. Further, the group B sends a notice of definition body to the work situation supervising means 29c, and the work situation supervising means 29c returns permission to use and the result to the group B.

Figure 22:
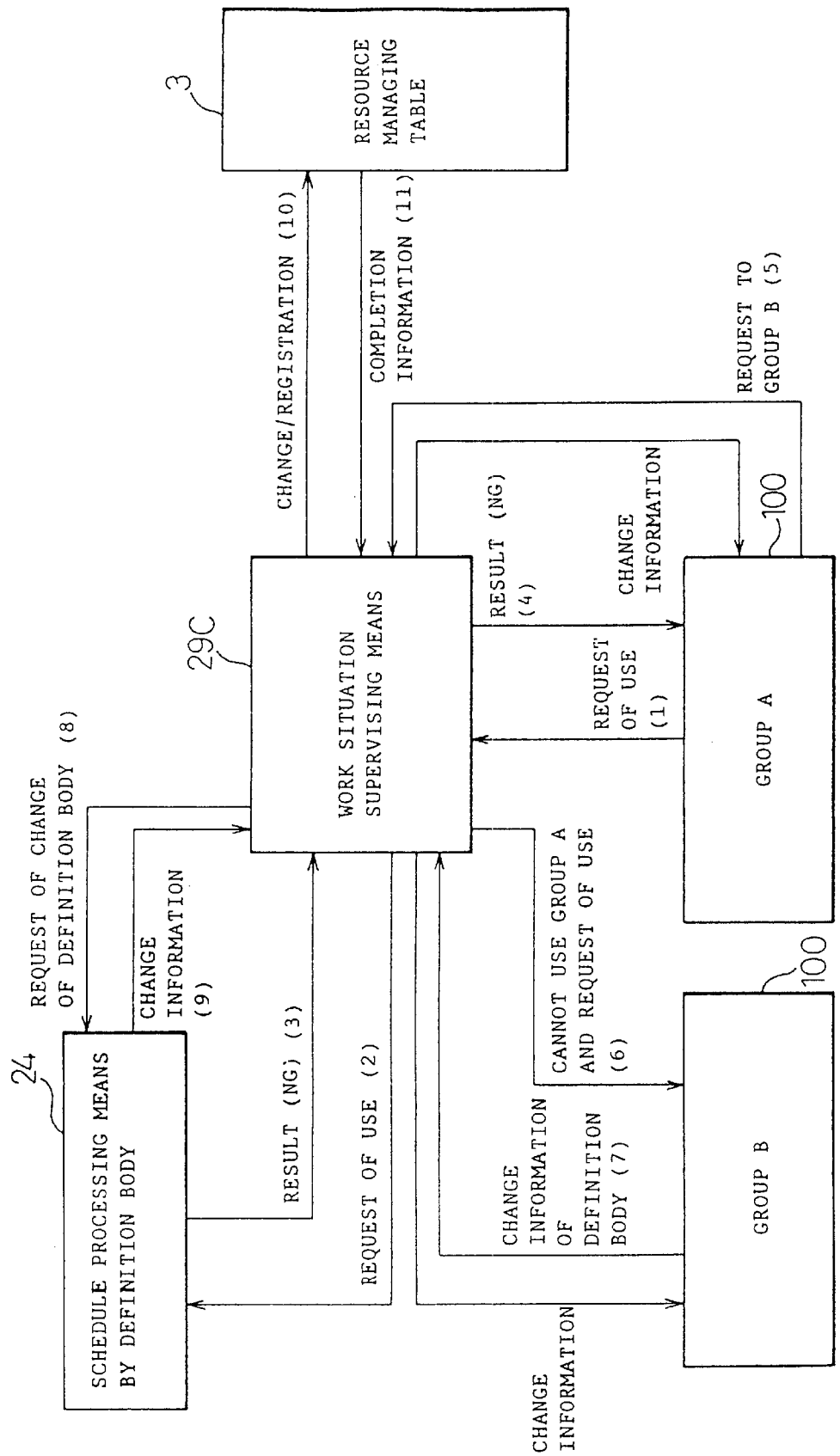
FIG. 22 shows an explanatory view for explaining an operation process of a request of a right to use between the resource utilizing and controlling apparatus and the group.

FIG. 22 shows an explanatory view for explaining an operation process of a request of the right to use between the resource utilizing and controlling apparatus and the group. In this case, although the each-group definition body is exclusively used, the permission to use is requested by the group B in order to obtain the right to use. In FIG. 22, (1) when the request of use is sent from the group A to the work situation supervising means 29c, (2) the request of use is sent from the work situation supervising means 29c to the schedule processing means 24, (3) the schedule processing means 24 returns the result (NG) indicating that the request is not acceptable, to the work situation supervising means 29c, and (4) the result is returned to the group A.

Next, (5) the group A sends a notice indicating the request to the group B, to the work situation supervising means 29c, and (6) the work situation supervising means 29c sends the request of use of the group B and unapproval of use (NG) of the group A to the group B. (7) the group B sends a notice of change of the definition body to the work situation supervising means 29c, (8) the work situation supervising means 29c sends a request of change of the definition body to the schedule processing means 24, and (9) the schedule processing means 24 sends a notice of change to the work situation supervising means 29c, and the notice of change is sent to the group B. Further, (10) the work situation supervising means 29c sends the change/registration to the resource managing table 3, and (11) the resource managing table 3 returns a notice of completion to the work situation supervising means 29c.

Figure 23:
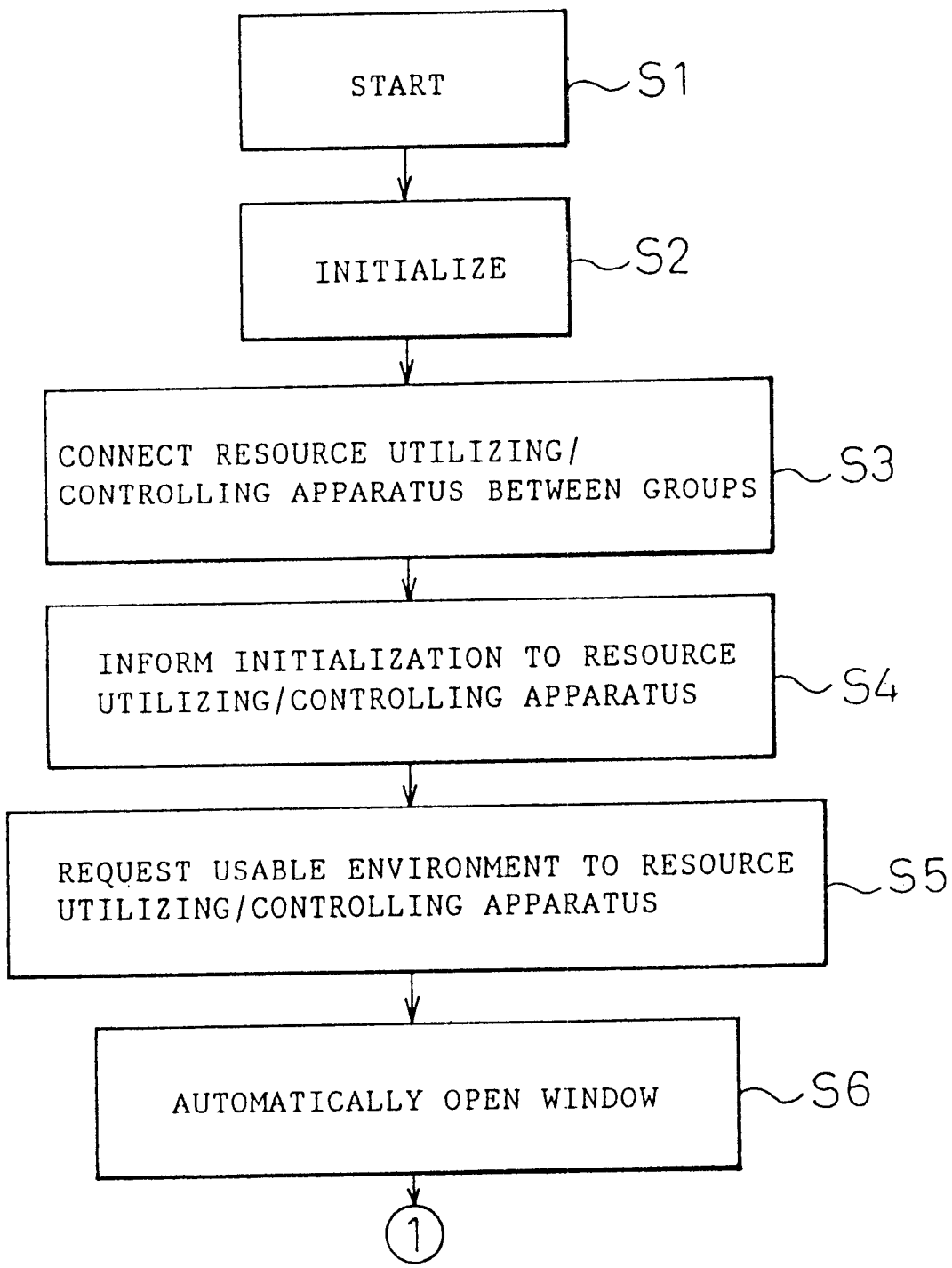
FIGS. 23 and 24 show process flowcharts (No. 1) in a monitoring means within each group.
Figure 24:
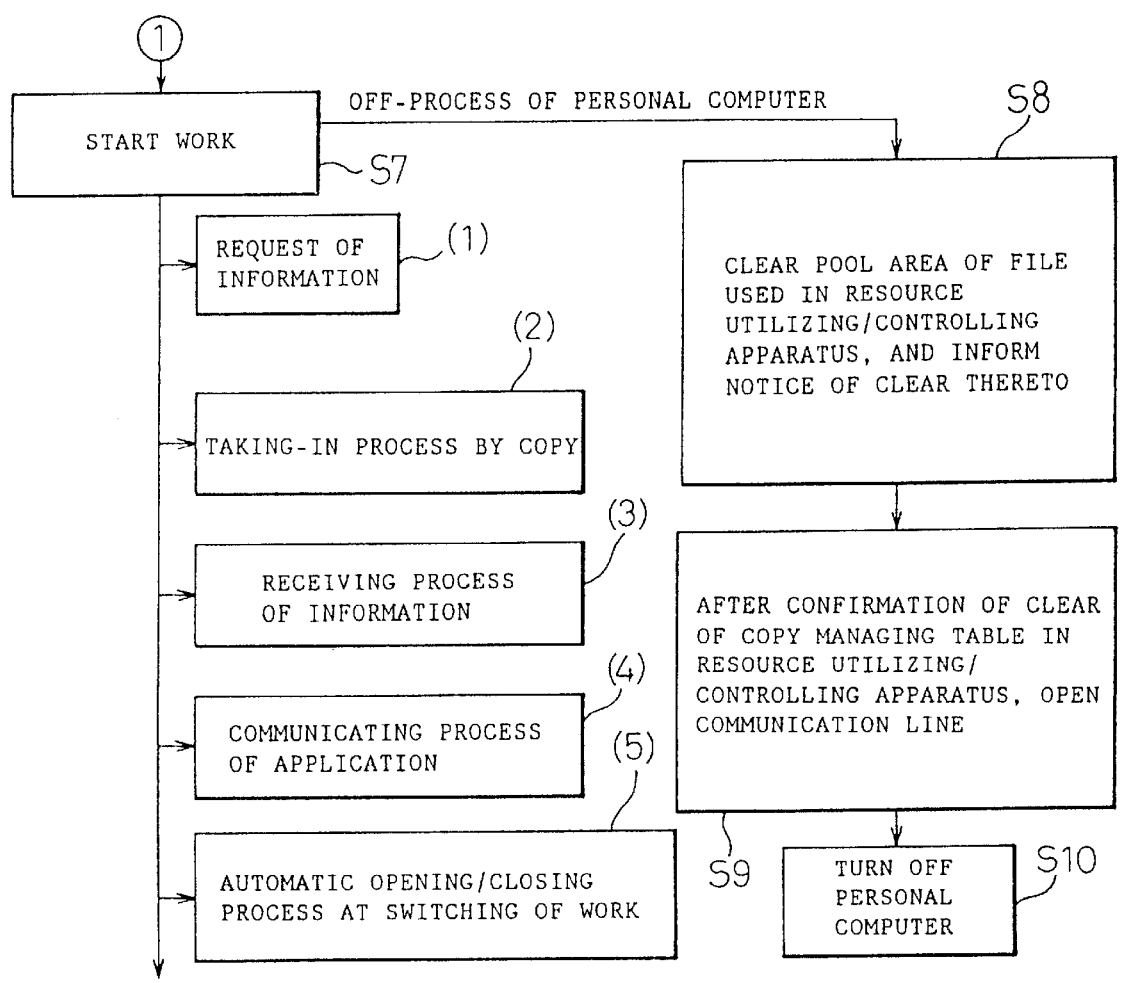

FIGS. 23 and 24 show process flowcharts (No. 1) in a monitoring means within each group. In FIGS. 23 and 24, when the process (S1) starts, a file area used by the resource utilizing and controlling apparatus between groups is cleared and initialized (S2). Next, the resource utilizing and controlling apparatus between groups is connected to the personal computer (S3), and a notice of initialization is passed to the resource utilizing and controlling apparatus (S4). Next, the usable environment is requested to the resource utilizing and controlling apparatus (S5), the window is automatically opened (S6) and the work is started (7).

The contents of the work after the start of the work are a request for information (1), a taking-in process by copy (2), a receiving process of information (3), a communication process of an application (4), and an automatic opening/closing process of the window, etc., at switching of work (5).

Next, the process of cut-off of the personal computer is performed as follows. That is, a pool area of the file used in the resource utilizing and controlling apparatus is cleared, and a notice of clear is informed to the resource utilizing and controlling apparatus (S8). Next, after the notice was sent, and after confirmation of clear of the copy managing table in the resource utilizing and controlling apparatus, the lines are opened (S9), and finally, the personal computer is turned off (S10).

Figure 25:
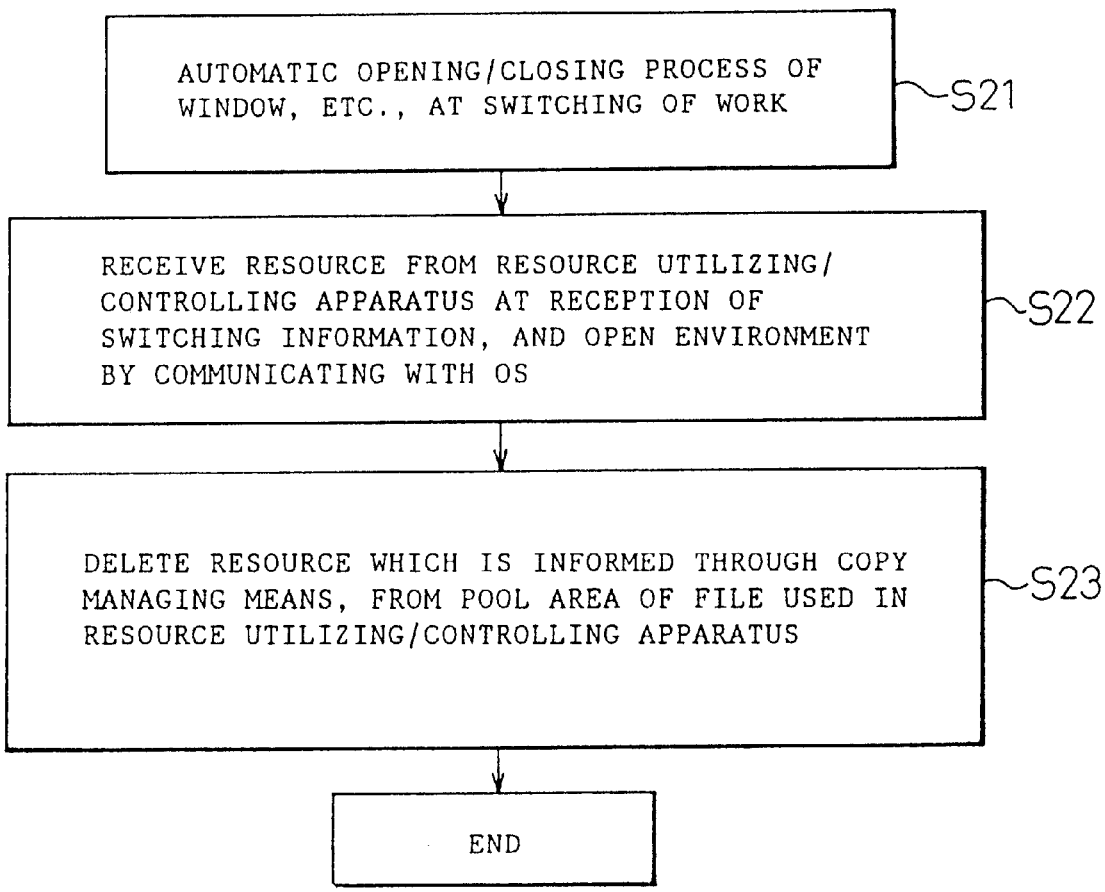
FIGS. 25 and 26 show process flowcharts (No. 2) in a monitoring means within each group.
Figure 26:
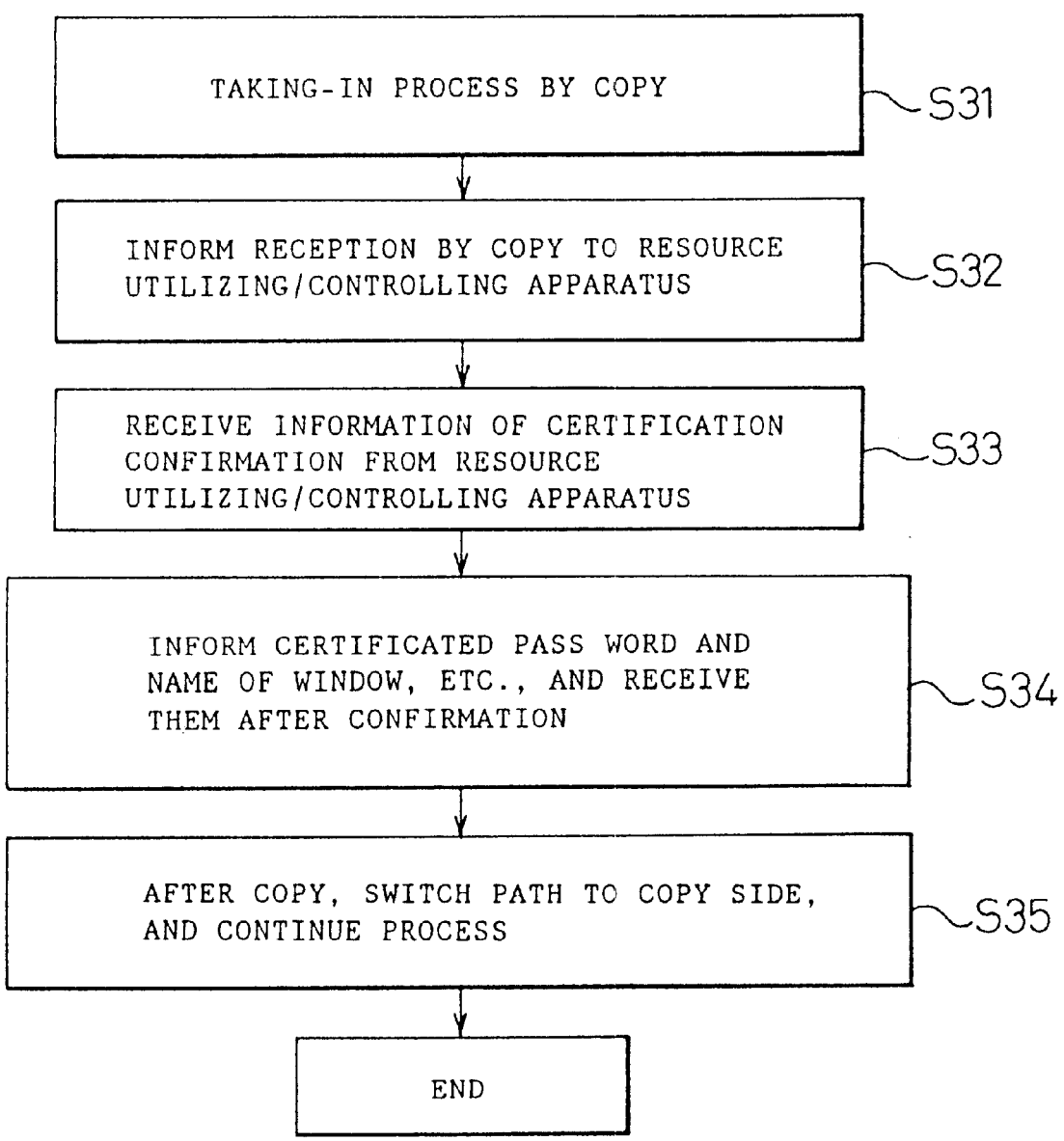

FIGS. 25 and 26 show process flowcharts (No. 2) in a monitoring means within each group. In FIGS. 25 and 26, in the automatic opening/closing process (S21) for the window at the change of the work shown by the process (5) in FIG. 24, when receiving the notice of change of the window from the resource utilizing and controlling apparatus, the communication is performed between the resource utilizing and controlling apparatus and the OS in the personal computer in order to open the window environment (S22). Next, the resources informed through the copy confirmation means in the resource utilizing and controlling apparatus (the resource in which the right to use is lost, such as copied window, etc.) are deleted from the pool area of the file used by the resource utilizing and controlling apparatus (S23), and the processes are completed.

In FIG. 26, in the taking-in process (S31) by the copy shown in FIG. 24 (2), the notice of reception is sent from the personal computer to the resource utilizing and controlling apparatus after copy (S32). Next, the personal computer receives the notice of confirmation of certification from the resource utilizing and controlling apparatus (S33). Next, the certification password and names of windows are informed to the resource utilizing and controlling apparatus. When the confirmation is obtained from the resource utilizing and controlling apparatus, the certification password and names of windows are sent to the resource utilizing and controlling apparatus (S34). After copy, the path to be used is changed to the copy aide in order to continue the process (S35) and processes are completed.

The effects of the present invention are summarized below.

That is, according to the present invention, since use of the resource in each group is basically permitted for only one group, and the exclusive use is ensured, it is possible to prevent destruction of the environment of the data, window, etc., caused by erroneous operation by another group.

Further, since the resources to be utilized are managed for each group unit, it is possible to prevent unauthorized coping to another person or unauthorized acquisition of the resource. Further, in the data communication between groups, by passing through the notice to the work supervising means, it is possible to request the environment, which cannot work within its own group, to another group, in the holding state of the security of the resource.

Further, after prolongation of use of the resource caused by the communication between the groups, it is possible to flexibly handle the environment of prolongation of the work. Even if the group having the right to use looses the right, it is possible for the temporary user to continuously use the group by continuing the right to the group having the precedingly next right.

Further, in use of the window, the window which lost the right to use at the change of the work is automatically deleted from screen, and it is possible to open the window used in the next work. Further, when the right to use the command and object (program) is lost, it is possible to refer to the command and object (program) so that only the command and object used for the new work remain.

When using the command and program used in the past, it was possible to confirm presence or absence thereof after query to the personal computer. In this case, when temporary request of the right to use is sent and after permission of use is received, it is possible to use the command and program after permission to use. The same processes as above are applied to the data.

As mentioned above, the present invention hag the following effects, i.e., since the management of the right to use the resource according to the contents of the work is performed by including the definition body of the work procedures, it is easy to supervise the works which are performed in parallel in each group, and it is possible to improve effective utilization of the resource and efficiency of the work in plural groups. Particularly, the present invention can contribute to improvement of effective utilization of the resource and effective work in groupware provided in a network environment.

Furthermore, it is possible to freely adjust a level of the security by separating use of copy and inhibition of copy. The matter of which the security is important is processed without use of copy. When the copy is permitted, the matter is processed by use of copy, but a structure which needs to confirm the certification password is provided. Further, in use of copy, it is possible to provide a structure in which the copy can be obtained from only monitor means in each personal computer in each group.

When the right to use is switched, the window etc., which is opened by the OS in each personal computer, is closed. Since the change of the window is informed to the OS so that the window is automatically opened, it is possible to automatically refer to the window, without searching, by its own group so that it is possible to reduce many handling operations. Capability of Utilization in Industry The resource utilizing and controlling apparatus between groups using groupware according to the present invention has many effects, as mentioned above, in an improvement of work efficiency for each group unit and the capability of utilization in industry is very large.

What is claimed is:

1. A resource utilizing and controlling apparatus between groups in a system which groups a plurality of computers interconnected to each other, and performs work applied to each group and applied between groups, characterized by:

work procedure preparing means for preparing work procedures based on an each-group work definition body defining work processes in accordance with a resource used for each group, and an all-group work definition body defining work processes in accordance with use between groups;

resource utilizing and controlling means for performing control including whether the resource can be utilized or cannot be utilized for each group and whether the resource can be utilized or cannot be utilized between groups, based on the work procedures prepared by the work procedure preparing means; and resource managing means for managing a work situation of the resource for each group or between groups.

2. A resource utilizing and controlling apparatus as claimed in claim 1, further comprising a predetermined communication means for communicating a work situation and a utilization situation of the resource for each group and between groups.

3. A resource utilizing and controlling apparatus as claimed in claim 1, wherein the resource utilizing and controlling means comprises a group managing table for storing work members and particular members.

4. A resource utilizing and controlling apparatus as claimed in claim 1, wherein the resource utilizing and controlling means comprises a connection managing table for storing connection state of each group.

5. A resource utilizing and controlling apparatus as claimed in claim 1, wherein the resource utilizing and controlling means comprises a copy managing table for storing permission to use, the number of copy and content of copy in the computer in each group.

6. A resource utilizing and controlling apparatus as claimed in claim 1, wherein the resource utilizing and controlling means comprises a work situation supervising means for supervising a work situation for each group and between groups.

7. A resource utilizing and controlling apparatus as claimed in claim 1, wherein the resource utilizing and controlling means comprises a schedule processing means for revising work procedures in accordance with a work situation for each group and between groups.

8. A resource utilizing and controlling apparatus as claimed in claim 1, wherein the resource utilizing and controlling means comprises a work definition body storage for storing the each-group work definition body and the all-group work definition body.

9. A resource utilizing and controlling apparatus as claimed in claim 1, wherein the resource utilizing and controlling means comprises a copy situation confirming means for confirming the copy situation of the resource in the computer in each group.

10. A resource utilizing and controlling apparatus as claimed in claim 1, wherein the resource utilizing and controlling means comprises a time supervising means for supervising work time assigned to the each-group work definition body and the all-group work definition body.

11. A resource utilizing and controlling apparatus as claimed in claim 1, wherein the resource managing means comprises a resource managing table for storing utilization situation of the resource for each group.

12. A resource utilizing and controlling apparatus as claimed in claim 1, wherein the resource managing means comprises: window storage managing means for storing and managing the window as the resource; program/command storage managing means for storing and managing the program and command as the resource; and data storage managing means for storing and managing the data as the resource.

13. A resource utilizing and controlling apparatus as claimed in claim 2, further comprising a group switching request means for requesting switching between groups through the predetermined communication means.

14. A resource utilizing and controlling apparatus as claimed in claim 2, further comprising an informing means for informing continuation of the work and permission for use of another resource through the predetermined communication means.

15. A resource utilizing and controlling apparatus as claimed in claim 1, wherein each of the plurality of computers comprises a monitoring means for monitoring utilization of the resource and applying permission to is use.

16. A resource utilizing and controlling apparatus as claimed in claim 1, wherein each of the plurality of computers comprises a copy area for copying the resource.

17. A resource utilizing and controlling apparatus as claimed in claim 2, wherein the predetermined communication means is a mobile telephone, a pocket bell, or an electronic note.

18. A resource utilizing and controlling apparatus as claimed in claim 1, wherein the work situation includes completion of the work, prolongation of incomplete work caused by time-out, change of the work caused by interruption of the work, movement of a right to use at utilization by another group, etc.

19. A resource utilizing and controlling method between groups in a system which groups a plurality of computers interconnected to each other, and performs work applied to each group and applied between groups, characterized by:
   a process for preparing an each-group work definition body defining work processes in accordance with a resource used for each group, and an all-group work definition body defining work processes in accordance with use between groups;
   a process for preparing work procedures based on the each-group work definition body and the all-group work definition body;
   a process for performing control including whether the resource can be utilized or cannot be utilized for each group and whether the resource can be utilized or cannot be utilized between groups, based on the work procedures prepared; and
   a process for managing work situation for each group or between groups for the resource.

20. A resource utilizing and controlling method as claimed in claim 19, further comprising a process for communicating a work situation and a utilization situation for each group or between groups through a predetermined communication means.

21. A resource utilizing and controlling method as claimed in claim 19, further comprising a process for monitoring utilization of the resource in each of the plurality of computers.

22. A resource utilizing and controlling method as claimed in claim 21, wherein the monitoring process comprises: a step of clearing and initializing a file area used in a resource utilizing and controlling apparatus between groups connected to the plurality of computers; a step of connecting the resource utilizing and controlling apparatus; a step of informing initialization of the resource utilizing and controlling apparatus; a step of requesting an environment which can utilize in the resource utilizing and controlling apparatus; and a step of automatically opening a window and starting the work.

23. A resource utilizing and controlling method as claimed in claim 22, wherein the work starting step includes: a step of requesting information; a step of taking in a copy; a step of receiving information; a step of communicating an application, etc., and a step of automatically opening/closing the window at switching of the work.

24. A resource utilizing and controlling method as claimed in claim 22, wherein the work starting step includes: a step of clearing a pool area of the file used for the resource utilizing and controlling apparatus when cutting off the computer; a step of sending a clear information; a step of confirming a table in the resource utilizing and controlling apparatus after sending and opening a line; and a step of turning off the computer.

25. A resource utilizing and controlling method as claimed in claim 23, wherein the automatic opening step at switching of the work includes: a step of receiving a window, etc., from the resource utilizing and controlling apparatus at reception of the switching information; a step of opening an environment with communication to the OS; and deleting the information sent through d copy managing means from the pool area of the file used in the resource utilizing and controlling apparatus.

26. A resource utilizing and controlling method as claimed in claim 23, wherein the taking-in step for the copy includes: a step of informing reception of the copy to the resource utilizing and controlling apparatus; a step of receiving a certification confirmation from the resource utilizing and controlling apparatus; a step of sending a certification password and a name of the window, etc.; a step of performing a process of sending after confirmation; and a step of continuing the process switching a path to the copy side after the copy.

27. A computer readable storage medium storing a program for executing the following processes on a computer used in a system which groups a plurality of computers interconnected to each other, and performs work applied to each group and applied between groups, the processes comprising:
   preparing an each-group work definition body defining work processes in accordance with a resource used for each group, and an all-group work definition body defining work processes in accordance with use between groups;
   preparing work procedures based on the each-group work definition body and the all-group work definition body;
   performing control including whether the resource can be utilized or cannot be utilized for each group and whether the resource can be utilized or cannot be utilized between groups, based on the work procedures prepared: and
   managing work situation for each group or between groups for the resource.

28. A computer readable storage medium storing a program for executing the following processes on a computer used in a system which groups a plurality of computers interconnected to each other, and performs work applied to each group and applied between groups, the processes comprising:

preparing an each-group work definition body defining work processes in accordance with a resource used for each group, and an all-group work definition body defining work processes in accordance with use between groups;

preparing work procedures based on the each-group work definition body and the all-group work definition body;

performing control including whether the resource can be utilized or cannot be utilized for each group and whether the resource can be utilized or cannot be utilized between groups, based on the work procedures prepared;

managing a work situation for each group or between groups for the resource; and controlling a work situation and a utilization situation for each group and between groups by communicating through a predetermined communication means.

* * * * *

UNITED STATES PATENT AND TRADEMARK OFFICE
CERTIFICATE OF CORRECTION

PATENT NO. : 6,385,639 B1
DATED : May 7, 2002
INVENTOR(S) : Yoshifusa Togawa

It is certified that error appears in the above-identified patent and that said Letters Patent is hereby corrected as shown below:

Title page,
Item [54], Title, change the title to -- A RESOURCE UTILIZING AND CONTROLLING APPARATUS AND A CONTROL METHOD --.

Column 14,
Line 35, change "content" to -- contents --.

Column 15,
Line 18, delete "is".

Column 16,
Line 26, change "d" to -- a --.

Signed and Sealed this

Twenty-ninth Day of October, 2002

*Attest:*

JAMES E. ROGAN
*Attesting Officer*    *Director of the United States Patent and Trademark Office*